United States Patent [19]
Pendleton et al.

[11] Patent Number: 5,564,464
[45] Date of Patent: Oct. 15, 1996

[54] STORAGE TANK SHUT-OFF VALVE

[75] Inventors: David R. Pendleton, Fairfield; James E. Kesterman, Cincinnati, both of Ohio

[73] Assignee: Dover Corporation, New York, N.Y.

[21] Appl. No.: 280,711

[22] Filed: Jul. 25, 1994

[51] Int. Cl.[6] .......................... F16K 21/18; F16K 31/126
[52] U.S. Cl. .......................... 137/393; 137/414; 137/446; 137/447; 141/198
[58] Field of Search ..................... 137/386, 393, 137/446, 447, 448, 414, 415; 141/198; 251/263

[56] References Cited

U.S. PATENT DOCUMENTS

| | | | |
|---|---|---|---|
| 2,646,817 | 7/1953 | Cox et al. | 137/393 |
| 3,078,867 | 2/1963 | McGillis et al. | 137/448 |
| 3,363,641 | 1/1968 | Mylander | 137/393 |
| 3,770,028 | 11/1973 | Madden | 141/59 |
| 3,776,283 | 12/1973 | Kramer et al. | 141/45 |
| 3,963,041 | 6/1976 | McGillis | 137/404 |
| 4,040,455 | 8/1977 | Swain et al. | 141/225 |
| 4,058,148 | 11/1977 | Potter | 141/198 |
| 4,064,907 | 12/1977 | Billington et al. | 137/446 |
| 4,191,208 | 3/1980 | Mylander | 137/393 |
| 4,312,373 | 1/1982 | Tilling et al. | 137/393 |
| 4,405,000 | 9/1983 | Fuller | 137/393 |
| 4,522,227 | 6/1985 | Mylander | 137/393 |
| 4,541,464 | 9/1985 | Christiansen | 137/446 |
| 5,010,915 | 4/1991 | Johnson et al. | 137/423 |
| 5,033,519 | 7/1991 | Puffer et al. | 141/198 |
| 5,141,019 | 8/1992 | LeBlanc et al. | 137/423 |
| 5,152,315 | 10/1992 | Lagache | 137/448 |
| 5,163,470 | 11/1992 | Maeshiba | 137/448 |
| 5,179,984 | 1/1993 | Sharp | 141/198 |
| 5,187,979 | 2/1993 | Edmark III | 73/304 C |
| 5,207,241 | 5/1993 | Babb | 137/447 |
| 5,235,999 | 8/1993 | Lindquist et al. | 137/15 |

FOREIGN PATENT DOCUMENTS

| | | | |
|---|---|---|---|
| 1142736 | 1/1963 | Germany | 137/446 |
| 605477 | 1/1960 | Italy | 137/446 |
| 681588 | 11/1950 | United Kingdom . | |
| 1515977 | 6/1978 | United Kingdom . | |

*Primary Examiner*—George L. Walton
*Attorney, Agent, or Firm*—Dinsmore & Shohl

[57] ABSTRACT

An improved control valve for a holding tank is provided for cutting off the flow of fluid into a holding tank device in response to achieving a predetermined fluid level in the holding tank. The assembly includes a housing configured for placement adjacent a spill container. The housing has an upper inlet and a lower outlet and a flow passage therebetween having a diameter of which is substantially constant along its longitudinal length. A valve poppet is situated within the flow passage and is axially rotatable between a substantially vertical, open position, that allows for the flow of fluid through the flow passage, and a closed position substantially blocking fluid flow through the flow passage when the holding tank has reached a predetermined level of fluid.

20 Claims, 7 Drawing Sheets

STORAGE TANK SHUT-OFF VALVE

TECHNICAL FIELD OF THE INVENTION

The present invention relates generally to shut-off valves for storage tanks, and, more particularly, to an improved hydraulically operated shut-off valve assembly featuring a substantially unencumbered flow passage having minimal pressure change along its length for high flow, and a high sensitivity shut-off mechanism for automatically cutting off the flow of liquids to a storage tank in response to the fluid level in the tank reaching a pre-determined fill level.

BACKGROUND OF THE INVENTION

It is very common to use storage tanks for a variety of fluids such as gasoline, diesel fuel, and oil and these storage tanks are usually filled through openings adjacent to or above the top of the tanks. Such openings usually have relatively small diameters that are sized to receive the dispensing elbow tube of a dispensing tube from a tank truck or other supply source. In most cases, these storage tanks are not equipped with gauges, and the operator filling the storage tank has no direct visual access to the internal space of the storage tank. Additionally, no other additional practical and reliable way of determining whether the storage tank is approaching a full level, while being filled, is generally available.

As a consequence of these factors, proper filling of storage tanks is a universal concern, as overfilling of storage tanks may result in spillage of the tank contents, damage to the tank or filling equipment, contamination of land or ground water, or other serious and potentially dangerous results. Concerns over spillage of the tank contents is particularly acute when the contents being filled into the tank are flammable, toxic and/or environmentally hazardous. The problems associated with overflow spillage from the filling of storage tanks has become so recognized that many local governments now require some liquid storage tanks to be filled only with equipment that automatically shuts off the flow of the liquid to the storage tank when full.

There have been a number of prior attempts to provide an overflow valve to address these problems, however, most of these valves require extensive modification to the existing storage tank set up, such as in Europe where the storage tank is remote or have other less than acceptable attributes. One such valve to be attached to the top of the storage tank is described in U.S. Pat. No. 4,770,317 (Podgers, et al.). In this device, the liquid fill passage is narrowed in diameter at a discrete portion between its inlet and outlet ends to establish a pressure drop in the valve. A pressure responsive latch engages the valve and releasably locks the valve in the open position. A vent passage has one open end in the storage tank at a pre-determined level and another open end communicating with the latch. As liquid flows through the passage, a pressure drop or partial vacuum is formed where the diameter of the passage narrows. The vacuum is vented through the vacuum passage while liquid in the storage tank is below the bottom end of the vent passage. When liquid rises to the level of the end of the vent passage, the pressure causes the latch to release and the valve to close off the passage.

There are, however, several drawbacks to devices such as taught by Podgers, et al. First, the valve must be reopened/reset manually after it is closed. In addition, the housing for this valve is generally not retrofittable to existing storage tank arrangements. Such valves must generally be installed permanently in the ground and secured to the riser pipe extending upwardly from the storage tank. In addition, valves of this type require a relatively high flow rate to effectuate closing of the valve, and the required narrowing of the flow passage limits operable fill rates.

Other valves heretofore available have also been found to be deficient. Some valves require complex installation, where substantial field assembly must be undertaken to custom fit the valve to the storage tank. Other valves have physical structures which cause obstructions in the liquid flow passageway itself, making it difficult or impossible for an operator to insert a dip stick through the valve to manually determine how much liquid is in the storage tank. In many installations, "sticking" is the only way to determine the fluid level of a tank, and the only way to prevent overfilling.

Other prior shut-off valves utilize swing-arm type reciprocating float controls to operate the valve closure in response to the rising fluid level in the tank. Some storage tanks have a permanent riser tube extended upwardly from near the bottom of the storage tank and permanently secured thereto, makes it impossible to use a swing float-type valve as an automatic shut-off valve. Generally, modifications must be made to the riser tube to enable the swing action of the valve within the upper portions of the tank. Examples of such shut-off valves and drop tubes are illustrated in U.S. Pat. No. 4,986,320 to Kesterman, et al. and U.S. Pat. No. 4,667,712 to Draft.

Many previously available valves utilizing float valve activators must also be placed lower in the tank to allow sufficient operating room, thereby also increasing the ullage and effectively limiting the useable volume of the holding tank itself. Many of these valves must also be manually reset once they are triggered closed, in order to prevent further flow of fluid and possible overfilling. This manual reset requirement leaves another possibility for inadvertent failure which can result in overfilling and spills.

Many of the previously available valves do not provide for any misfit between the edge of the valve and the interior wall of the flow passage so that liquid can drain after flow is shut off. Instead, those valves have secondary passageways which allow for slow drainage, sometimes exceeds one minute after the valve is closed.

In the past, many valve assemblies used as a shut-off valve for storage tanks were made to withstand the shock of having flow through the passageway abruptly terminated when the valve closes while liquid is still flowing into the assembly. This configuration requires more material to construct and makes it expensive to manufacture. Also, prior valves require a minimum flow rate through the flow passageway of between 150 and 250 gallons per minute (570 and 950 liters per minute) to be operative. A lower flow rate through the passageway make the valve inoperable and this becomes problematic, especially when filling a storage tank without a pumping mechanism to increase flow of liquid. As a result, it can be seen that the shut-off valves heretofore available have a number of shortcomings, and an improved valve with substantially unencumbered flow characteristics, easily retrofittable onto casting equipment, and featuring improved sensitivity and automatic resetting functions was needed.

SUMMARY OF THE INVENTION

It is an object of the present invention to provide an improved shut-off valve which overcomes the problems and shortcomings of valves known or available heretofore.

It is also an object of the invention to provide a decoupled shut-off valve and activator that automatically reset independently of each other after the valve closes in response to a predetermined liquid level in the holding tank.

It is another object of the invention to provide a valve assembly that allows a dip stick to be inserted thought he flow passage to measure the liquid level in the holding tank.

Another object of the invention is to provide a fully assembled valve assembly that can be more easily mounted in pre-existing spill containers and used on riser tubes permanently attached to a holding tank.

It is also an object of the invention to provide for substantially laminar and constant pressure flow through the flow passage so the valve is affected by flow therethrough until the valve closes in response to a predetermined level in the holding tank.

Another object of the invention is to provide a decoupled valve and activator system that features increased sensitivity to respond to a minimal change in pressure upon the fill level in the tank being attained.

Another objective of the invention is to provide a shut-off valve device that can be added to an already existing holding tank and spill container.

It is also an object of the invention to provide a shut-off valve that allows quicker drainage of the liquid head once flow is terminated into the assembly.

It is an object of the invention to provide a hydraulically operated valve that can be activated with a reduced flow rate through the flow passage and activator system.

Another objective of the invention is to provide an assembly that can withstand the shock when the valve substantially closes cutting off the flow of liquid through the flow passageway.

Additional objects, advantages, and other features of the invention will be set forth and will become apparent through the description that follows, and, in part, will become apparent to those skilled in the art upon examination of the following, or may be learned with practice of the invention. The objects and variants of the inventions may be realized and attained by means of the instrumentalities in combinations particularly pointed out in the appended claims.

To achieve the foregoing and other objects, and in accordance with the purpose herein, an improved spill control valve for a holding tank is provided for cutting off the flow of fluid in response to achieving a predetermined fluid level in the holding tank. The assembly includes a housing configured for placement in a spill container. The housing has an upper inlet and a lower outlet and a flow passage therebetween having a diameter of which is substantially constant along its longitudinal length. A valve poppet is situated within the flow passage, and is rotatable between a substantially vertical, open position, that allows for the flow of fluid through the flow passage, and a closed position substantially blocking fluid flow through the flow passage when the holding tank has reached a predetermined level of fluid.

An aspirator located at least partially within the housing creates a slight underpressure, and comprises a sensing tube inlet extending downwardly into the holding tank with its lower end situated at a predetermined maximum fill level within the holding tank. The aspirator is operably connected to the valve assembly for urging the control valve from its opened position toward its closed position in response to the change in pressure in the aspirator when the fluid level within the tank reaches the lower end of the sensing tube.

The assembly also preferably has a deflector in the flow passage secured above the valve poppet. The deflector is configured to protect the valve from the insertion of a dip stick, and to help isolate the valve in its vertical open position from fluid flowing through the flow passage during filling procedures. When the predetermined fluid level is reached within the tank, an activator assembly responds to the change in the underpressure within the aspirator, urging the valve poppet from its open position toward its closed position to shut off the flow of fluid through the control valve.

A means is provided for automatically resetting the control valve to its open position once fluid flow has ceased. In a preferred embodiment, the activator assembly includes a pressure sensitive reciprocable piston which automatically resets once fluid flow has stopped independently of the automatic reset of the poppet valve. This independent resetting is achieved as a result of the decoupled nature of the activator piston and the poppet valve. In a most preferred arrangement, the activator piston is normally biased to its non-activated or valve-open position, and the valve poppet is unevenly weighted to facilitate resetting to a normally open position.

BRIEF DESCRIPTION OF THE DRAWINGS

The brief drawings, incorporated in and forming a part of the specification, illustrate several aspects of the present invention, and together with the description, serve to explain the principles of the invention. In the drawings.

Reference will now be made in detail to the present preferred embodiment of the invention, an example which is illustrated by the attached drawings.

DETAILED DESCRIPTION OF THE INVENTION

Figure 1:
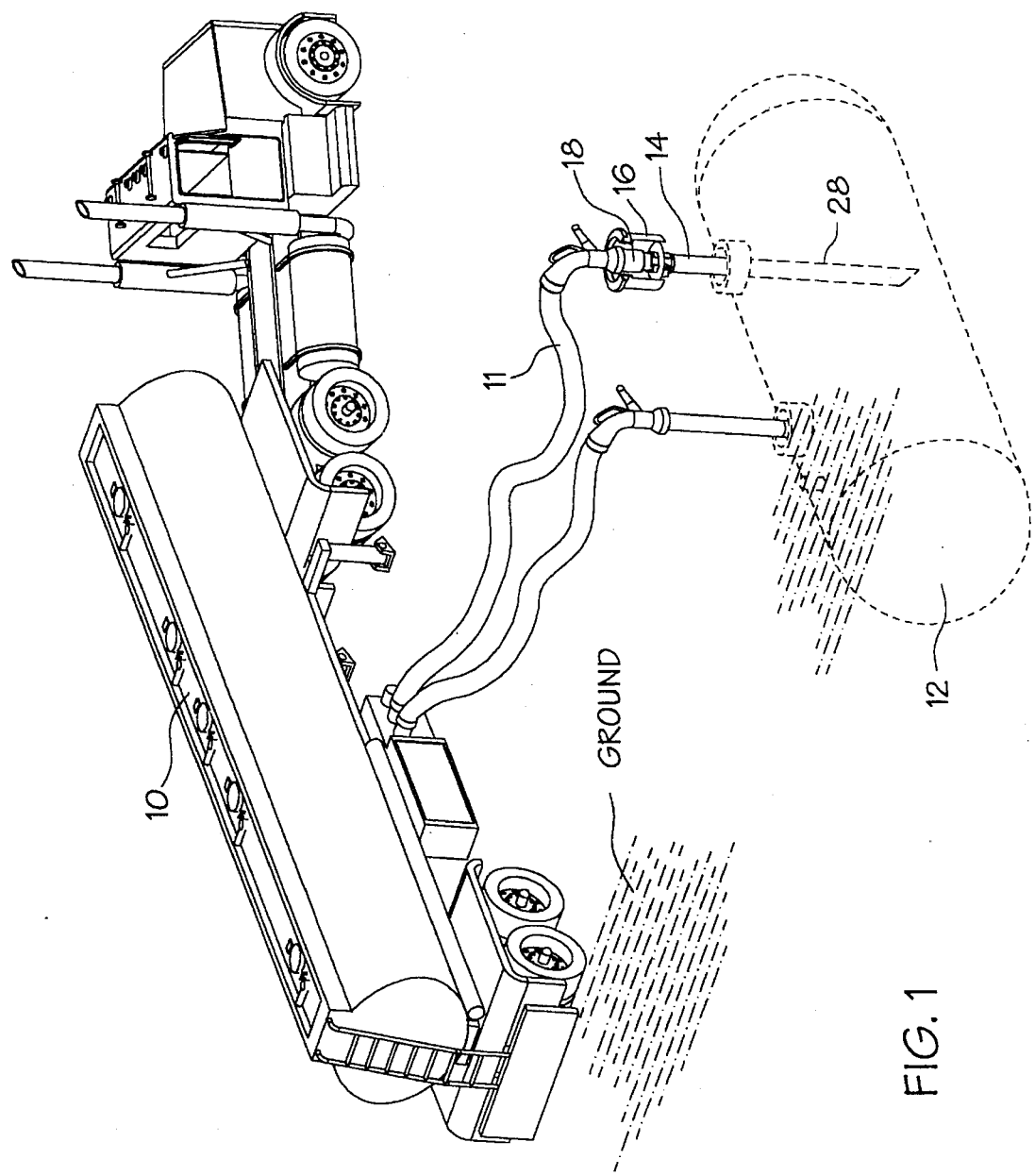
FIG. 1 is a schematic view showing the present invention mounted in a spill container arrangement for an inground holding tank, along with a tank truck illustrated shown in position to fill the holding tank.
Figure 2:
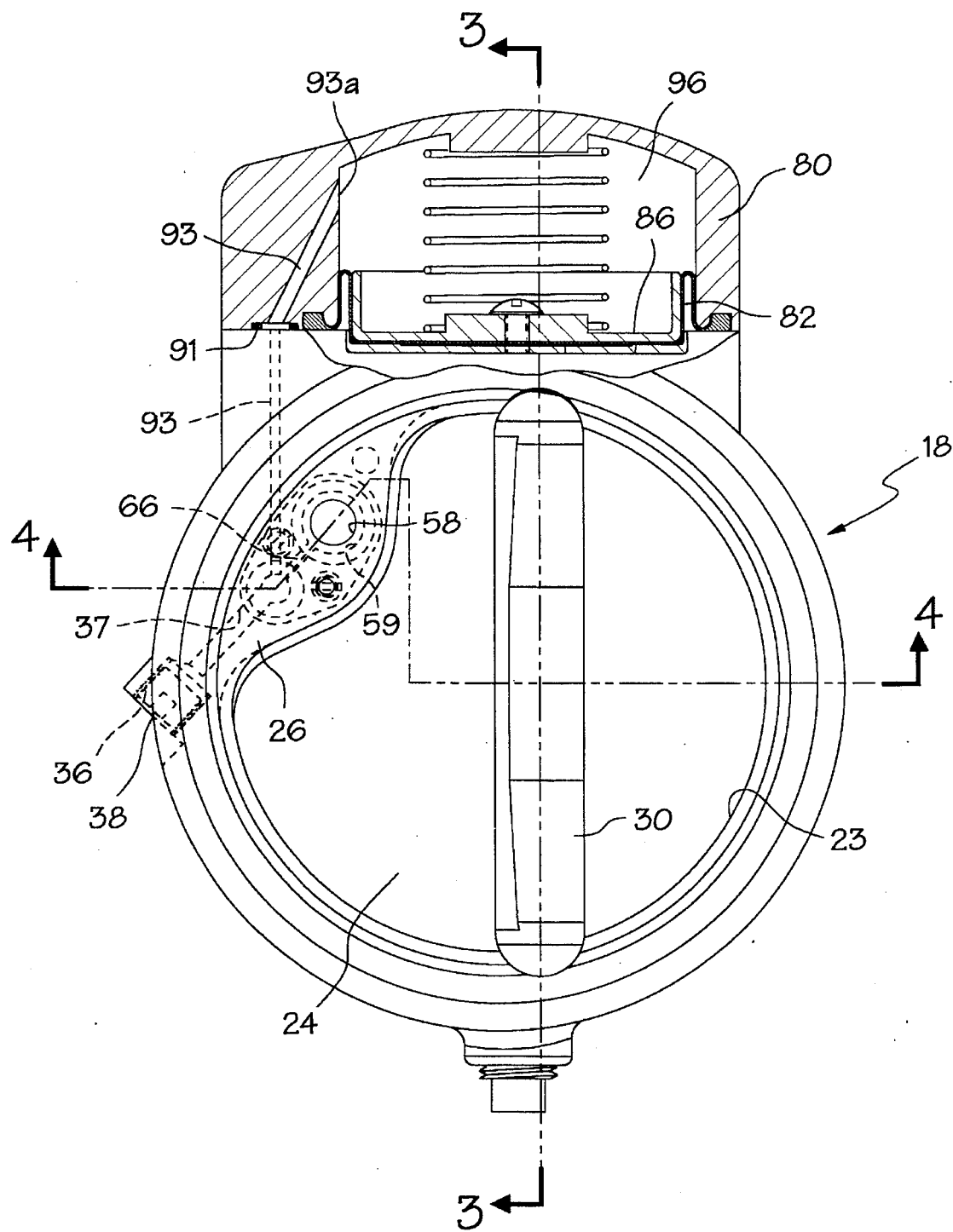
FIG. 2 is a top plan view of a preferred embodiment of a shut-off valve assembly made in accordance with the present invention look showing the valve poppet in its opened position.

Referring now to the drawings in detail, wherein like numerals indicate the same elements throughout the views, FIG. 1 shows a schematic view of relatively conventional holding tank fill arrangement in which the present invention can be advantageously utilized. Particularly, FIG. 1 shows a tank truck 10 used for transporting a flammable liquid such as gasoline, diesel fuel, oil, kerosene or like fluids. The truck 10 is parked near a holding tank 12 shown as an underground installation for illustrative purposes. Fluid (e.g. gasoline) within the truck 10 is discharged by gravity alone, and flows to the holding tank 12 through a dispensing line 11. The holding tank 10 has a riser 14 extending upwardly from adjacent the top of the tank 12 to a spill container 16. Within the riser 14, in many installations, a drop tube 28 lines portions of the riser 14 and extends to near the bottom of the tank 12. In some applications, the riser and drop tube structures are provided as a substantially continuous, permanent, structure.

Figure 3:
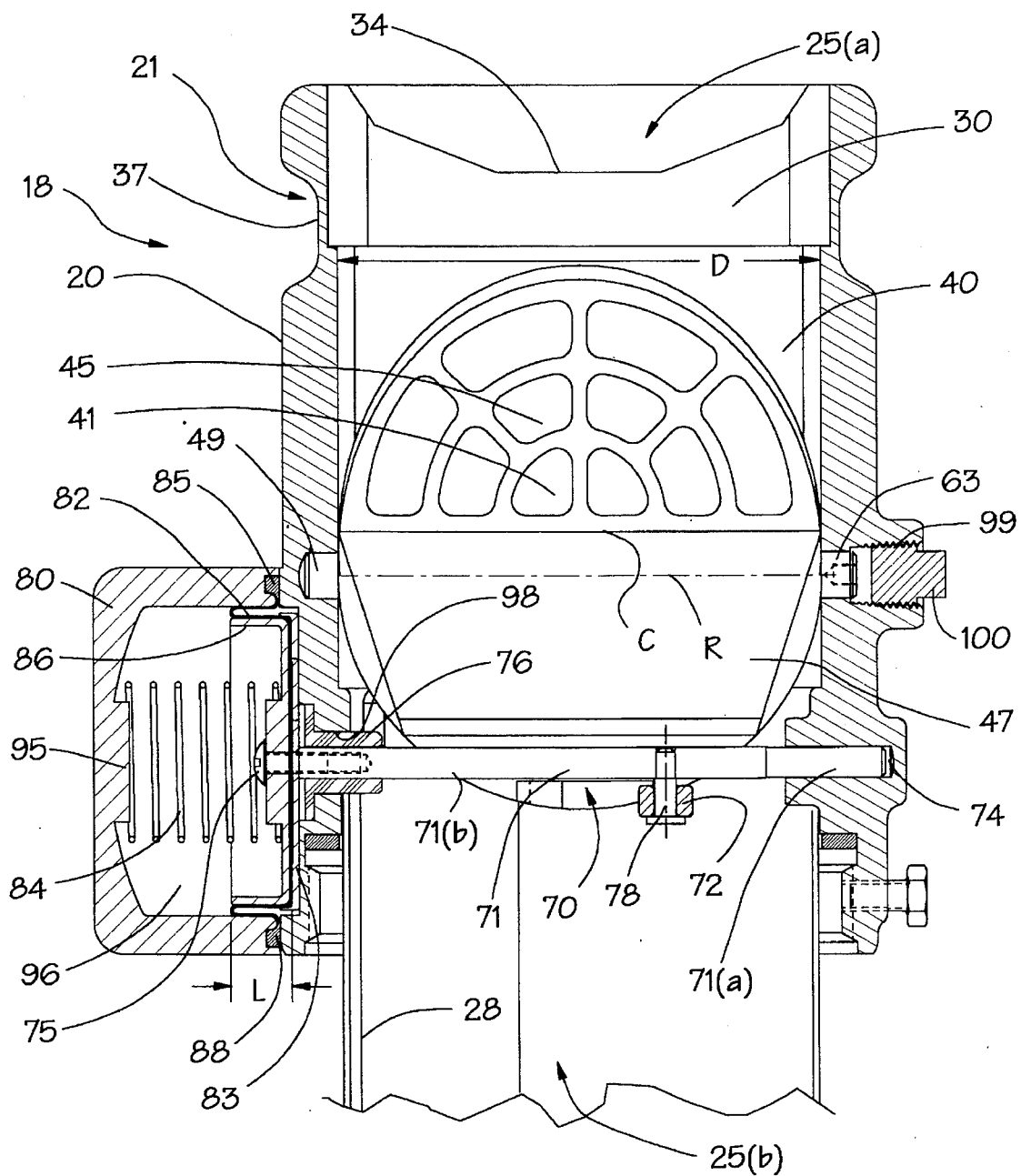
FIG. 3 is a vertical cross-sectional view of the shut-off valve assembly of FIG. 2, taken along line 3—3 thereof, and showing the valve in its open position.

The present invention can advantageously be used in service stations where the operator must remain in attendance during the filling operation to close off the truck outlet when the tank 12 has reached a predetermined level of fill. The present invention provides an automatic overflow prevention, fluid flow operated control valve device (e.g. 18) which can be mounted in a spill container (e.g. 16). The device 18 has a housing 20 that is preferably provided of a hard coated and/or wear resistant material for protection against corrosion and other deterioration which can result from exposure to fluids such as gasoline, chemicals and the like, as well as hard use and other environmental influences such as water or salt. In a preferred embodiment, the housing 20 (as seen in FIG. 3) is made from cast aluminum and finished with a hardcoat anodize. As shown in FIG. 3, a collar 21 is also provided for securing a fluid dispensing elbow on line 11 to the housing 20 via a Kam-Loc or threaded connection. In a preferred embodiment, the collar 21 includes an integral adapter ring 37 for accommodating conventional Kam-Locs and the like.

Figure 4:
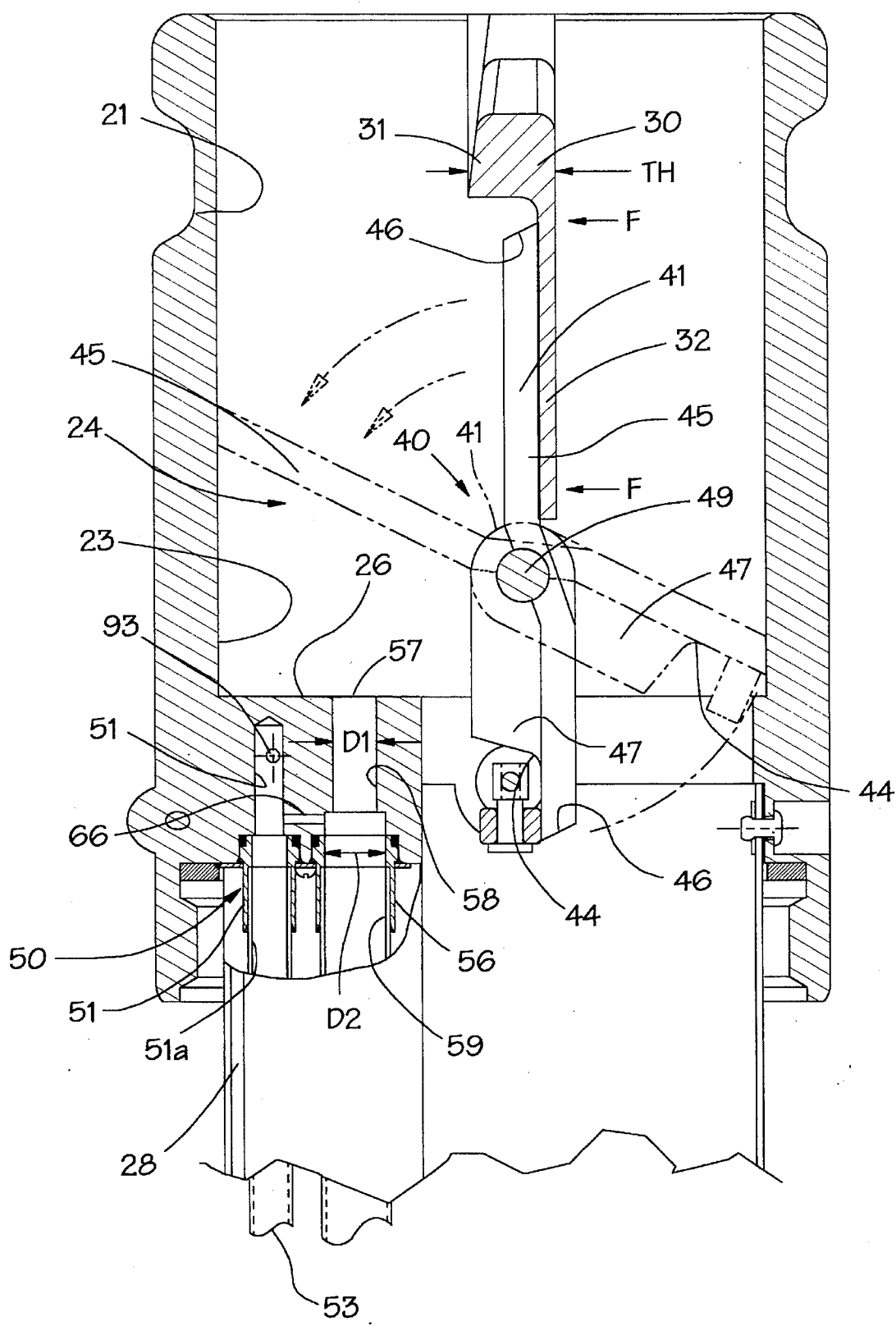
FIG. 4 is a vertical cross-sectional view of the shut-off valve of FIG. 2, taken along line 4—4 thereof, and showing the poppet valve in the open position with solid lines, with phantom lines showing the poppet valve in its closed position.

The housing 20 has a central, longitudinal flow passage 24 that extends between an upper inlet (e.g. 25a) and a lower outlet (e.g. 25b) wherein the diameter (D) remains substantial constant throughout its longitudinal length. Located adjacent the upper inlet 25a, and at least partially within passage 24, is a deflector 30 and aspirator shelf 26, as shown in FIG. 4 which are discussed in detail below. As used herein, the term "substantially constant" is used to connote that flow passage 24 is not significantly changed along its longitudinal length to cause any substantial changes in the fluid flow rate or volume as it passes through valve assembly 40. This is important, as many previously available valve structures have required diameter changes somewhere along their length to create pressure differences and/or to otherwise control the flow of fluid through the valve. As mentioned above, these physical restrictions and diameter changes also tend to result in less efficient valve structures and less desirable performance results. As will be appreciated, while aspirator shelf 26 will extend outwardly into the flow of fluid somewhat within flow passage 24, the presence of this structure does not significantly obstruct the fluid flow through valve assemblies made in accordance with the present invention.

Figure 5:
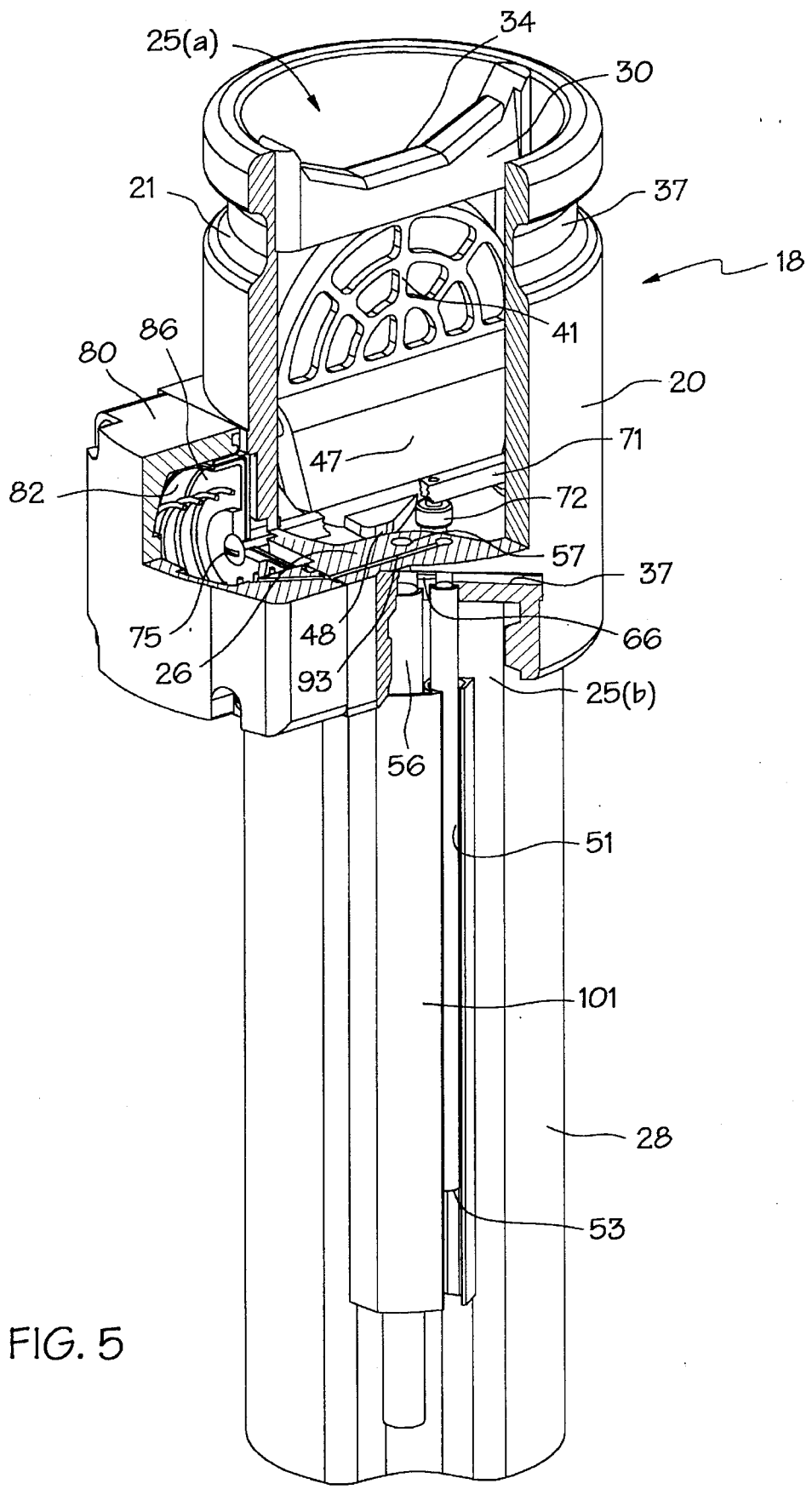
FIG. 5 is a partially broken out perspective view of a preferred embodiment of the shut-off valve assembly of the present invention, showing the valve in the fully open position and the activator is in its non-activated position.
Figure 6:
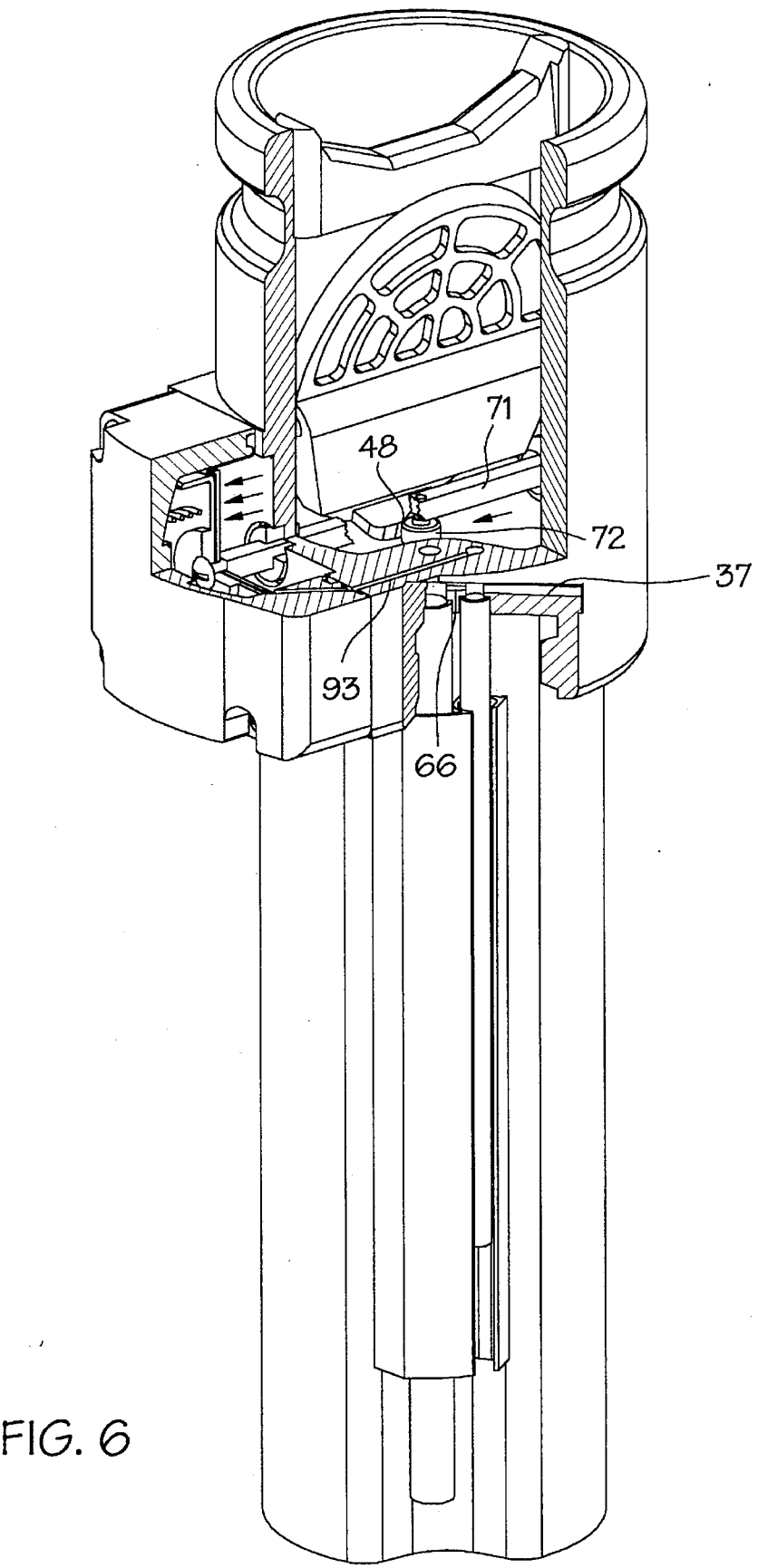
FIG. 6 is a partially broken out perspective view of the shut-off valve assembly of FIG. 5, showing the valve in the partially closed (i.e. shut-off activated) position and the activator in its extended or activated position.
Figure 7:
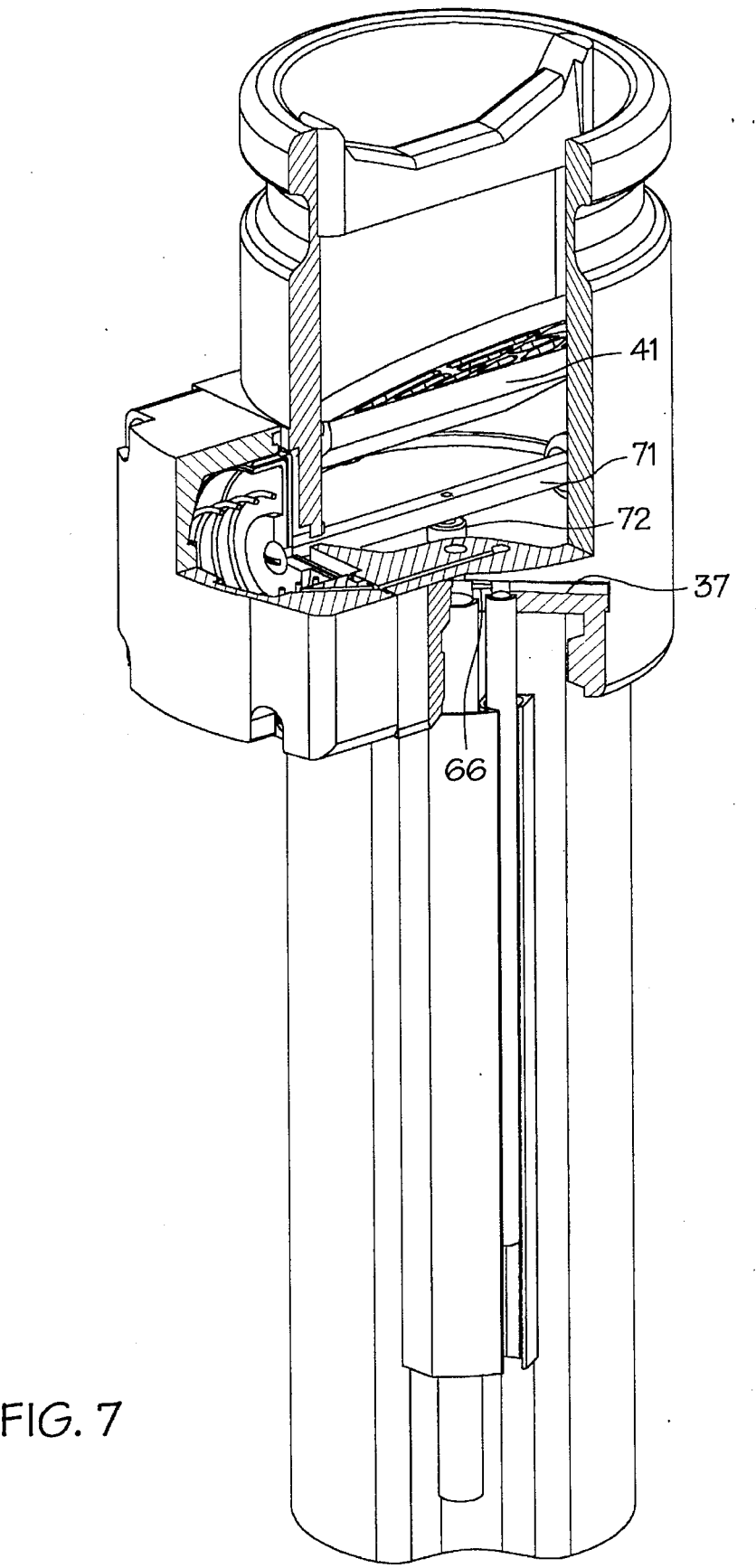
FIG. 7 is a partially broken out perspective view of the shut-off valve assembly of FIG. 5, showing the valve poppet in its fully closed position, and the activator assembly already reset in its non-extended position.

As best illustrated in FIGS. 3–7, a valve assembly 40 is preferably located within flow passage 24 about mid-way along the longitudinal length of housing 20. Valve assembly 40 preferably includes a shut-off valve poppet 41 which is rotatably mounted within flow passage 24 such that it will have a substantially vertical, open position or condition (as best seen in FIGS. 4 and 5), and a laterally rotated closed position or condition (as best seen in FIG. 7). As will also be appreciated, valve poppet 41 is preferably rotatably mounted within housing 20 via a rotational shaft 49, which may or may not include bearings at its opposite ends to reduce rotational friction. Valve poppet 41 can be provided of any corrosion resistant and non-sparking material such as cast aluminum, stainless steel, or a combination of materials such as zinc or aluminum alloy. Rotational shaft 49 can be mounted in a conventional arrangement within the oppositely disposed aft bearings or bores 63, and may be clearance fit through valve poppet 41 from the exterior of housing 20, such as via opening 99. Such opening is preferably sealed against leakage, such as via the threaded pipe plug 100, once the shaft and poppet arrangement have been satisfactorily mounted.

As best seen in FIGS. 3 and 4, it is also preferred that shaft 49 be offset slightly from passing through the center of valve poppet 41. This eccentric rotational arrangement is preferred in order to assist in the closing and reset functions of valve assembly 40. As best seen in FIG. 3, the axis of rotation of valve poppet 41 (e.g., R) will preferably be offset from the effective center line (C) of poppet 41 such that the upper or first portion 45 of poppet valve 41 is slightly oversized with respect to the lower or second portion 47 thereof. As will be better understood from the details set forth below of the operation of the present invention, when actuated for closing procedures, the oversized first portion 45 of poppet valve 41 will be thrust outwardly and into the incoming fluid stream, and forced downwardly by the flowing fluid into closed position with more force than fluid flow will oppose the closing procedures by interaction of the fluid flow with the smaller lower portion 47 of valve 41. This structural arrangement also enables the valve assembly to effectuate positive and rapid closing even though the valve poppet is physically decoupled from the actuator assembly elements once the closing procedure has been initiated. As will be explained, while decoupling of the activator structure from the poppet is not imperative for a structure made in accordance with the present invention, it is advantageous to minimize the complexity of the overall product, and to facilitate the automatic resetting features of the device.

As can be appreciated from a review of FIGS. 3 and 4, when poppet valve 41 is in open position the valve assembly 40 is preferably substantially isolated from the dynamics of fluid flowing through flow passage 24. This isolation is preferably provided via a deflector 30 which can be rigidly mounted adjacent the upper portions of housing 20 and at least partially within flow passage 24. As best illustrated in FIG. 4, deflector 30 preferably comprises an outwardly and downwardly (i.e., from top to bottom of housing 20) flared or tapered surface 31. It has been found that for some installations, especially those including a significant bend or elbow in the fill line adjacent to housing 20 of the present invention, fluid flowing into valve assembly 18 of the present invention may be relatively turbulent and otherwise non-laminar in character. Tapered surface 31 has been found to facilitate isolation of the poppet valve 41 from turbulent fluid flow which might otherwise cause the premature closure of valve 41, and to facilitate maintaining substantially laminar flow of fluid through the control valve of the present invention. As will be appreciated, deflector 30 generally isolates the upper portions of valve poppet 41 from axially flowing fluid adjacent the top of housing 20, however, cannot prevent turbulent fluid from laterally deflecting the poppet valve from its substantially vertical open condition throughout its longitudinal journey through the control valve 18. Lateral fluid forces on the poppet valve 41 could potentially displace the valve from its substantially vertical position, which would subject it to downward and closing forces from the inflowing fluid.

To provide additional isolation for poppet valve 41 in its open condition, it is preferred to provide deflector 30 with an extension element 32 which extends downwardly within flow passage 24 and laterally across the diameter of such flow passage to provide a substantially parallel shield adjacent and behind the upper portion 45 of poppet valve 41. This deflector extension 32 thereby prevents lateral fluid forces (i.e. generally in the direction indicated by arrow F on FIG. 4) from inadvertently displacing poppet valve 41 into the fluid flow path during filling procedures.

As best illustrated in FIG. 3, the upper edge (e.g., 34) of deflector 30 is preferably downwardly scalloped to accommodate the attachment of a conventional adaptor or convex dust cover (not shown) which is often utilized to cover the fill inlet of a storage tank. In use, deflector 30 and its extension 32 prevent the initial burst of fluid flowing into flow passage 24 from prematurely closing valve poppet 41, and help establish a fluid flow of substantially laminar through the longitudinal length of flow passage 24. As will also be understood, the thickness "th" of deflector 30 can be maintained sufficiently narrow to allow easy longitudinal extension and removal of a dipstick or similar fluid level indicating device through flow passage 24, while sufficiently isolating the valve assembly 40 from fluid flow and from damage from inserted dipsticks and the like. It is contemplated that deflector 30 can be attached to housing 20 by a variety of conventional means including a slot/press fit arrangement, welding, adhesives, and other fastening means.

As best illustrated in FIG. 4, an aspirator shelf 26 is preferably provided along the lower portion of an outside wall (e.g., 23) of flow passage 24. This shelf can be integrally formed with housing 20, or attached as a separate piece through conventional methods. Provided through shelf 26 is a longitudinal aspirator bore 58 for connection with a downwardly depending suction tube 56. The inlet 57 for suction tube 56 is preferably flush with the top surface of aspirator shelf 26, while the tube 56 extends vertically downwardly from below inlet 57 and the lower part of shelf 26. As will be understood, aspirator bore 58 is formed with a smaller upper diameter (D1), which directly communicates with a lower bore diameter (D2) along its longitudinal length.

The difference between diameters D1 and D2 is important, as it must be predetermined to create an underpressure when fluid flows therethrough. It has been found that the difference in diameters D1 and D2 must be sufficiently large to create a predetermined underpressure (e.g., a vacuum pressure of between about 0.5 and 2 psi), yet not so large as to cause the flowing fluid to detach from the outer diameter of the tube as it flows downwardly. Particularly, diameters D1 and D2 must be sufficiently close to one another in relative size such that fluid flowing through the smaller diameter will effectively expand such that the meniscus of the fluid allows the flowing fluid to reattach to and substantially fill the larger diameter tube as it flows downwardly. This reattachment is critical to form an underpressure adjacent the diameter change within suction tube 56. This underpressure will be effected through connecting tube 66 which provides fluid communication between suction tube 56, aspirator sensing tube 51, and a connected vacuum passage 93 which will be described in greater detail below. This underpressure will create an aspirator effect, and will effectively withdraw air from the storage tank via sensing tube 51 during filling operations.

Aspirator shelf 26 is also provided with a blind bore for sensing tube 51 having a downwardly extending adjustable length tube (51a) which is placed in fluid communication with aspirator bore 58 via connecting tube 66 extending therebetween. Upon installation, the extension 51a of sensing tube 51 is cut to length such that its inlet edge 53 is located at the maximum desired fluid level (i.e., the "full" level) of the tank. This can be accomplished by cutting the tube extension 51a such that its lower edge 53 is located at the maximum desired fluid level in the tank. While it may be preferred to mount sensing tube 51 and/or suction tube 56 on the exterior of a drop tube (e.g. 28), as shown in FIG. 5, in order to minimize potential turbulence of fluid flowing within flow passage 24, it is not required. A protector 101 having a tubular configurating and substantially fitted around the outside of sensing tube 51 is provided to prevent inadvertent cutting of the sensing tube 51 when the tube 51 is being cut to customize the valve device 12. The protector 101 can also hold the sensing tube 51 in place eliminating the need for brackets to holding sensing tube 51 in place.

During filling operations, fluid flowing through longitudinal bore 58 of suction tube 56, and into longitudinal bore 59 of larger diameter creates a slight underpressure which tends to pull ambient air inwardly through sensing tube 51 and connecting tube 66. The varying diameters of suction tube 56 (i.e., bores 58 and 59), connecting tube 66, and sensing tube 51 will vary according to the application, but will be chosen to provide an effective aspirator device which will establish a vacuum or underpressure of predetermined relative size (e.g., between about 0.5 and 2 psi). The longitudinal length of suction tube 56 will generally be as long as possible to provide a significant head to establish the desired underpressure in the aspirator, and will generally be of substantially equal length with the upper drop tube 28 extending downwardly within the holding tank.

Connecting tube 66 will preferably have a diameter determined so that it is large enough to prevent fluid flowing through suction tube 56 from easily flowing into connecting tube 66 and/or restricting air flow therethrough, and such that it is not so small as to prevent drainage of condensation or other fluid which might make its way into tube 66 in use. In an exemplary embodiment, connecting tube 66 may be a bore having a diameter of approximately 1/16" (1.6 mm). The connecting tube 66 might be formed by drilling from the exterior of housing 20 (e.g. via access opening 36 and access bore 37). Following drilling operations, access opening 36 might be sealed by a threaded pipe plug (e.g. 38) or similar sealing arrangement.

The valve poppet 41 is moved from its open position (FIGS. 4 and 5) toward its closed position (FIGS. 6 and 7) by an activator assembly 70 or similar means that is responsive to relatively small changes of pressure in the aspirator. In a preferred arrangement, activator means 70 includes an activator shaft 71 having a first end 71a and a second end 71b. To minimize friction and to increase sensitivity, a roller 72 is freely rotatable mounted on pin 78 attached to shaft 71. In a preferred embodiment, the surface of the roller 72 has a minimal coefficient of friction to allow easy movement against a tapered activator ramp 48 preferably attached to valve poppet 41. Activator shaft 71 may be made of any corrosion resistant and non-sparking material, such as stainless steel, and is preferably laterally reciprocally situated in flow passage 24 with its first end 71a received in a support/guide channel 74 formed in the housing 20.

It is preferred that the activator shaft 71 be non-rotatably mounted to maintain the alignment of roller 72 with ramp 48, such as by featuring a non-cylindrical (e.g., square)

cross-section, as illustrated adjacent second end 71b. That squared end 71b is shown as being mounted through a shaft bore 98 formed through housing 20, and held there within by a bushing 76 having a complimentary inner conformation for facilitating lateral reciprocation. The activator shaft 71 might have a square cross-section only adjacent its first end 71a to facilitate formation of support/guide channel 74, as it is much simpler to bore round channels into housing 20. The bushing 76 is similarly preferably configured to be inserted and secured in a circular cross-section hole 98 in the housing 22, and is preferably made from a low friction material such as plastic.

As seen best in FIGS. 4–7, the end of the second portion 47 of poppet 41 (e.g. at 44) for allowing for the valve 41 to remain substantially vertical in its open position without the valve 41 interference from the activator shaft 71 and roller 72 on shaft 71. As shown in FIG. 5, attached to the valve 41 is a counterweight 42. The weight 42 preferably provides sufficient mass so that the valve's center of gravity is in the second portion 47. As will be appreciated, this preferentially loading of poppet 41 is illustrated as a preferred means to facilitate automatic resetting of the poppet to its normally open position. In one embodiment, counterweight 42 is attached to the valve 41 using screws. In a preferred embodiment, the counterweight 42 and valve 41 are provided as an integral unit, and can be formed as a single piece.

The second end 71(b) of shaft 71 is preferably secured to an actuator member of piston 86. Particularly, adjacent to housing 20 and aligned with shaft 71 is an actuator assembly 70 for closing valve 40 when fluid level in a tank has reached a predetermined minimum. A preferred means for undertaking this function comprises an actuator piston 86 to initiate closure of valve poppet 41. Piston 86 is preferably a simple, cup-shaped member mounted for lateral reciprocation between non-actuated and actuated positions within a substantially hollow, sealed cylinder or cap 80. As seen best in FIG. 3, a screw 75 can be used to secure piston 86 to shaft 71. The piston 86 has a height "h" which can serve, in conjunction with the internal shape of cap 80, as an ultimate stop to determine the stroke of piston 86 therewithin.

A rolling diaphragm seal 82 is preferably disposed around the piston 86 to form a flexible static seal of piston 86 and chamber 96. Diaphragm 82 can be a Bellow-Frank type (such as available from Bellofram) that is resilient and tapered such that it inverts and rolls back to its fully extended condition with minimal resistance in response to movement of piston 86. The diaphragm 82 has a diameter corresponding to the outer diameter of piston 86 and the inner volume of chamber 96, and, in an exemplary embodiment might have a stroke length of about ¾" (19.05 mm). In such an exemplary application, 2.31 inches (58.67 mm), and diaphragm might have a thickness of about 0.017 inches (0.43 mm). Diaphragm 82 will preferably be formed of fluid resistant, flexible materials, such as fuel resistant nitrile, fluorocarbon, or similar compounds.

A biasing means such as stainless steel compression spring 84 shown in FIG. 3 is preferably situated between the piston 86 and a diaphragm cap 80. This biasing means provides a predetermined pressure (e.g., about 0.7 psi) against the piston 86 to generally maintain the actuator assembly in "open" condition, as seen in FIG. 5. As can be appreciated, when piston 86 is in "open" or non-actuated position (FIGS. 3 & 5), biasing means 84 will be in its fully extended position, tending to hold the piston against diaphragm 82 and washer 83. Particularly, washer 83 is shown as comprising a shallow cup-like piece corresponding in shape and size to the outer portions of piston 86. During assembly, diaphragm 82 is effectively sandwiched between piston 86 and the washer 83, whereby diaphragm will be effectively held in place and protected from damage by the combination of the piston and the washer.

As can also be seen in FIG. 3, when piston 86 is in its non-actuated or open condition, the sidewalls of diaphragm 82 are effectively folded on one another (or inverted) in a bellows-like fashion, with the outer portions of diaphragm 82 being held in sealed condition via the outer diaphragm bead 85. Bead 85 provides an effective O-ring seal between diaphragm cap 80 and housing 20, and simultaneously serves to hold diaphragm 82 in position within bead groove 88. While other forms of seals can be effectuated in ways available to those of ordinary skill in the art, the flexible diaphragm/O-ring bead arrangement has been found to be quite effective, substantially frictionless, and reliable. The inner portions of piston 86 can preferably be formed with a nub or bushing for receiving and holding biasing spring 84 in position and a similar retaining protuberance 95 can also be formed on the inner portions of cap 80.

Enclosing chamber 96 is diaphragm cap 80 which is sealingly mounted to housing 20 as described above. Preferably, cap 80 is removable for assembly ease, and possibly, maintenance, and attaches to housing 20 via screws or the like (not shown). Connecting chamber 96 to the aspirator means 50 is a diaphragm vent or vacuum passage 93. Passage 93 provides fluid communication between connecting tubes 66 and the internal volume of piston chamber 96. The passage 93 is connected to the outer portions of diaphragm cap 80 so that as piston 86 reciprocates to its actuated or "closed" position (i.e., see FIG. 6), the diaphragm 82 will not block vacuum passage 93. In an exemplary embodiment, vacuum passage 93 has a diameter of about 3/16" (4.01 mm) and extends within cap 80 to housing 22 to connect with tube 66 and suction tube 56. At the connection between the cap 80 and housing 22, an O-ring seal 91 is preferably provided for the connection of passage 93 therethrough.

In operation, a dispensing or fill line 11 may be connected either directly to shut-off valve assembly 18 (e.g., via the locking ring 37), or to an inlet tube thereabove. Poppet valve 41 is normally maintained in open condition as shown in FIG. 5 as a result of its preferentially weighted lower portion 47 and the automatic resetting nature of the present invention. As liquid flow is commenced from its source (tank truck 10), incoming liquid enters flow passage 24 where it first encounters deflector 30 which tends to reduce turbulence and create laminar flow within valve 40. Deflector 30 normally tends to isolate poppet valve 41 from the fluid flowing through shut-off valve 18, and deflector extension 32 prevents lateral fluid flow forces from prematurely closing valve 41, as described above. It should also be noted that ramp 48 situated near the bottom of lower portion 47 of poppet valve 41 may preferably be provided in a substantially skeletal form to minimize negative flow characteristics which might be imparted by a more solid member. Particularly, it has been found that if ramp 48 is provided as a solid piece (as opposed to a skeletal or perforated member), it can sometimes catch flowing fluid and cause unwanted movement of poppet valve 41 prior to closure actuation. The resulting laminar fluid flow flows through flow passage 24 and exits into drop tube 28 through outlet 25b.

As the fluid moves longitudinally through flow passage 24, some of the liquid is forced into suction tube 56 at its upper inlet 57. As described above, as fluid flows through suction 56, an underpressure is formed at the change of diameters therewithin, causing an effective vacuum which draws air inwardly through sensing tube 51, and then through connecting tube 66.

As fluid continues to fill tank 10, the interior fluid level eventually rises to the predetermined "full" level, and reaches the lower edge 53 of sensing tube 51. At this point, air flow from the holding tank 12 is cut off, and the continuing underpressure within suction tube 56 immediately begins to draw air inwardly from chamber 96 behind piston 86. Air is drawn from chamber 96 as a result of the fluid communication provided between connecting tube 66 and vacuum passage 93. Removal of air from chamber 96 likewise creates an underpressure behind piston 86, tending to pull it outwardly toward its actuated or extended position shown in FIG. 6. As best seen by comparison of FIGS. 5 and 6, as piston 86 moves outwardly in response to the vacuum within chamber 96, activator shaft 71 is reciprocated laterally in an outward direction, moving roller 72 into caming interaction with ramp 48 connected to valve poppet 41. The outward stroke of piston 86 and the interaction between the actuator elements, shown in this example as roller 72 and ramp 48, need only be sufficient to move poppet valve 41 from its substantially vertical open position, rotating it laterally into the fluid flow moving through flow passage 24 (as seen in FIG. 6). Once the upper portion 47 of valve 41 is moved into the flow stream of incoming fluid, the fluid itself will quickly force poppet valve 41 downwardly into its closed position, as seen best in FIG. 7.

When poppet valve 41 effectively closes off the diameter of flow passage 24, further fluid flow will be immediately stopped, and the operator of the filling procedures will be alerted to shut off flow at truck. When further fluid supply is terminated, valve poppet 41 will remain in a closed position due to the head of fluid which will remain in fill line 11 thereabove. It is preferred that a predetermined amount of misfit, or drainage openings, be maintained between poppet valve 41 and the interior walls of flow passage 24, or in the poppet valve 41, so that upon termination of the filling procedures, the fluid head above the shut-off valve can slowly drain into the tank. The preferred predetermined amount of misfit or drainage openings allow for a leakage rate between the valve 41 and the interior walls 24 of less than three gallons per minute. Once the head of fluid above the poppet valve 41 is significantly reduced by such drainage, the weighted nature of the poppet valve (i.e., counterweight 42) will automatically return valve 41 to its substantially vertical open condition, thus allowing quick drainage of dispensing line 11.

It should be noted that once piston 86 has displaced poppet valve 41 into the fluid flow stream (FIG. 6), it is no longer in direct physical connection with valve 41 (i.e., it is decoupled), and takes no further role in closing poppet valve 41. As mentioned above, while the actuator means of the present invention could be designed for direct and full time mechanical operation of the valve (i.e., between open and closed positions), it is preferred that the actuator means for closing the shut-off valve be decoupled for both facilitating closing and resetting procedures.

It should also be noted that as soon as fluid flow through suction tube 56 is terminated (e.g., upon closure of the shut-off valve), the underpressure provided by aspirator 50 will cease, the underpressure within chamber 96 will be eliminated, and piston 86 will automatically return to its normally "open" position as a result of the biasing spring 84. Operation of the present control valve is directly determined by the fluid flow, and the sensitivity of the system can be maintained by proper design of the aspirator and actuator mechanisms to less than 1 p.s.i. pressure differentiations. It is also important to note that the resetting of piston 86 and the particular actuator roller 72, as described with respect to the preferred embodiments shown herein, will often take place while poppet valve 41 remains in closed position (i.e. during draining of the fill line). As mentioned above, the actuator means and the closure valve structure of the present invention can generally remain decoupled from one another except when necessary for initiating closure of the valve. This arrangement minimizes friction, keeps the valve structure as simple as possible, and enables highly sensitive shut-off reactions and improved automatic resetting features. Also, this arrangement eliminates the force required to overcome any mechanical catching means that would connect the poppet and the activator shaft if in a coupled arrangement.

Having shown and described the preferred embodiments of the present invention in detail, it will be apparent that modifications and variations by one of ordinary skill in the art are possible without departing from the scope of the present invention defined in the appended claims. Several potential modifications have been mentioned and others will be apparent to those skilled in the art. For example, it should be understood that the activator shaft, roller, ramp and piston activator assembly described herein could be substituted by an alternate arrangement responsive to the underpressure changes caused by the flowing fluid herein. Similarly, alternative resetting mechanics could be provided for the biasing spring and/or the eccentric, weighted poppet design. Accordingly, the scope of the present invention should be considered in terms of the flowing claims and is understood not to be limited to the details of structure and operation shown and described in the specification and drawings.

We claim:

1. A fluid flow operated overflow control valve for a liquid holding tank, said control valve comprising:

A substantially hollow body having upper and lower open ends and a flow passage of predetermined diameter therebetween for allowing liquid flow therethrough;

A rotatable poppet situated within said flow passage for rotation between an open condition and a closed condition;

An aspirator located at least partially within said flow passage for establishing a pressure differential in response to the flow of liquid through said control valve, said aspirator comprising a sensing tube extending downwardly from said body, and having an inlet situated in at least one of said flow passage and said liquid holding tank at a predetermined liquid fill level;

An activator responsive to the pressure differential from said aspirator when said predetermined liquid fill level has been reached for moving said rotatable poppet into the flow of liquid in said flow passageway toward said closed condition;

A deflector situated within said flow passage and generally above and aligned with said rotatable poppet when said poppet is in the open condition; and a reset element which acts upon said poppet for automatically resetting said poppet toward the open condition after liquid flow through said flow passage has ceased.

2. The control valve of claim 1 wherein said poppet is substantially planar in configuration.

3. The control valve of claim 1, wherein said sensing tube is adjustable in length for adaption to a specific holding tank.

4. The control valve of claim 1, wherein said activator further comprises a biased diaphragm assembly.

5. The control valve of claim 4, wherein said activator comprises a reciprocable piston, and wherein reciprocation of said piston forces said poppet from a substantially vertical open condition into the flow of fluid within said flow passage to facilitate movement of said poppet to its closed condition.

6. The control valve claim 1, wherein said aspirator further comprises a suction tube through which liquid passes to create said pressure differential by drawing air from the holding tank via said sensing tube inlet.

7. The control valve of claim 6, further comprising a vacuum passageway between said sensing tube, said suction tube and said actuator, whereby when said sensing tube is closed by the rising fluid level, said pressure differential initiates said activator to move said poppet into the flow of liquid in said flow passageway.

8. The control valve of claim 1, wherein said reset element comprises an element for normally biasing said activator to the open condition.

9. The control valve of claim 8, wherein said reset element further comprises a counterweight disposed on at least a portion of said poppet.

10. The control valve of claim 9, wherein said activator and said poppet are automatically reset independently of one another.

11. The control valve of claim 1, further comprising an extended shield which helps to isolate at least a portion of said poppet in the open condition from lateral forces from the flow of liquid in said flow passage.

12. The control valve of claim 1, wherein said deflector further comprises a recess to receive and isolate an upper portion of said poppet from the flow of fluid while said poppet is in the open condition.

13. The control valve of claim 1, wherein said flow passage further comprises a substantially open, unencumbered longitudinal access to said holding tank when said poppet is in the open condition.

14. The control valve of claim 1, wherein said activator comprises a reciprocable cam device which selectively urges said poppet toward the closed condition.

15. The control valve of claim 1, where said activator further comprises an activator element responsive to the fill level in said liquid holding tank, wherein said activator element interacts to move said poppet into the flow of liquid when said predetermined liquid fill level is reached.

16. A hydraulically operated automatic shut-off valve for a liquid holding tank comprising:

a substantially hollow body having upper and lower open ends and a flow passage of predetermined diameter for allowing liquid flow therebetween;

a rotatable poppet situated within said flow passage for rotation between a substantially vertical open condition and a closed condition;

an aspirator located at least partially within said flow passage for establishing an underpressure in response to the flow of liquid through said shut-off valve, said aspirator comprising a sensing tube extending downwardly from said body and having a lower end situated in at least one of said flow passage, and said liquid holding tank at a selected maximum predetermined liquid fill level;

an activator responsive to said underpressure when said predetermined liquid fill level has been reached for initiating closing of said poppet;

a deflector situated within said flow passage and generally above and aligned with said rotatable poppet when said poppet is in the open condition;

a first reset element connected to said poppet for independently and automatically resetting said poppet to its normally open condition following fill operations; and said activator comprising a second reset element for independently and automatically resetting said activator to its open condition following fill operations.

17. The shut-off valve of claim 16, further comprising an extended shield which helps to isolate at least a portion of said poppet in the open condition from lateral forces from the flow of liquid through said flow passage.

18. The shut-off valve of claim 16, wherein said deflector further comprises a recess to receive and isolate an upper portion of said poppet from the flow of fluid when in its open condition.

19. The control valve of claim 16, wherein said reset element comprises an element for manually biasing said activator to the open condition.

20. The control valve of claim 19, wherein said reset element further comprises a counterweight disposed on at least a portion of said poppet.

* * * * *